(12) United States Patent
Shiki

(10) Patent No.: US 12,118,712 B2
(45) Date of Patent: Oct. 15, 2024

(54) INSPECTION SYSTEM, MANAGEMENT APPARATUS, INSPECTION METHOD, RECORDING MEDIUM, AND MANUFACTURING METHOD OF ARTICLE

(71) Applicant: CANON KABUSHIKI KAISHA, Tokyo (JP)

(72) Inventor: Mika Shiki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 17/455,351

(22) Filed: Nov. 17, 2021

(65) Prior Publication Data

US 2022/0164938 A1 May 26, 2022

(30) Foreign Application Priority Data

Nov. 25, 2020 (JP) .................................. 2020-194820

(51) Int. Cl.
| | |
|---|---|
| G06T 7/00 | (2017.01) |
| G06F 18/21 | (2023.01) |
| G06V 10/22 | (2022.01) |
| G06V 10/75 | (2022.01) |

(52) U.S. Cl.
CPC .............. G06T 7/001 (2013.01); G06F 18/21 (2023.01); G06V 10/22 (2022.01); G06V 10/751 (2022.01); G06T 2207/20081 (2013.01); G06T 2207/30164 (2013.01)

(58) Field of Classification Search
None
See application file for complete search history.

(56) References Cited

U.S. PATENT DOCUMENTS

| | | | | |
|---|---|---|---|---|
| 7,369,240 | B1* | 5/2008 | Abbott | G01N 21/896 356/429 |
| 7,382,457 | B2* | 6/2008 | Kiraly | G01N 21/896 356/429 |
| 7,551,274 | B1* | 6/2009 | Wornson | G01N 21/896 356/429 |
| 7,570,796 | B2* | 8/2009 | Zafar | G03F 1/84 382/145 |
| 8,723,946 | B2* | 5/2014 | Takahashi | G01N 21/8806 348/92 |

(Continued)

FOREIGN PATENT DOCUMENTS

JP 2014066599 A 4/2014

*Primary Examiner* — Randolph I Chu
(74) *Attorney, Agent, or Firm* — Canon U.S.A., Inc. IP Division

(57) ABSTRACT

An inspection system includes an image capturing unit configured to capture an image of a workpiece, and a processing unit configured to determine quality of the workpiece based on the image captured by the image capturing unit, wherein the processing unit determines whether the workpiece includes a defect based on a second image captured by the image capturing unit in a second inspection step, wherein the processing unit extracts a defective portion candidate of the workpiece based on the second image and a first image captured by the image capturing unit in a first inspection step performed before the second inspection step, and wherein the processing unit changes an inspection condition of the first inspection step based on the extracted defective portion candidate of the workpiece.

14 Claims, 4 Drawing Sheets

(56) References Cited

U.S. PATENT DOCUMENTS

| | | | |
|---|---|---|---|
| 11,704,786 B2* | 7/2023 | Yokoi | G06T 7/60 |
| | | | 382/141 |
| 11,748,874 B2* | 9/2023 | Floeder | G06T 7/337 |
| | | | 382/141 |
| 11,769,242 B2* | 9/2023 | Zhang | G06T 7/0004 |
| | | | 382/149 |
| 2002/0054703 A1* | 5/2002 | Hiroi | G06T 7/001 |
| | | | 382/149 |
| 2004/0227107 A1* | 11/2004 | Cox | G03F 7/709 |
| | | | 250/548 |
| 2006/0104500 A1* | 5/2006 | Obara | G01N 21/9501 |
| | | | 382/145 |
| 2010/0067780 A1* | 3/2010 | Kawaragi | G01N 21/95607 |
| | | | 382/218 |
| 2011/0242312 A1* | 10/2011 | Seki | G01N 21/9505 |
| | | | 348/125 |
| 2022/0301136 A1* | 9/2022 | Hiroi | G01N 21/9501 |
| 2023/0162347 A1* | 5/2023 | Hyatt | G01N 21/8851 |
| | | | 382/141 |

* cited by examiner

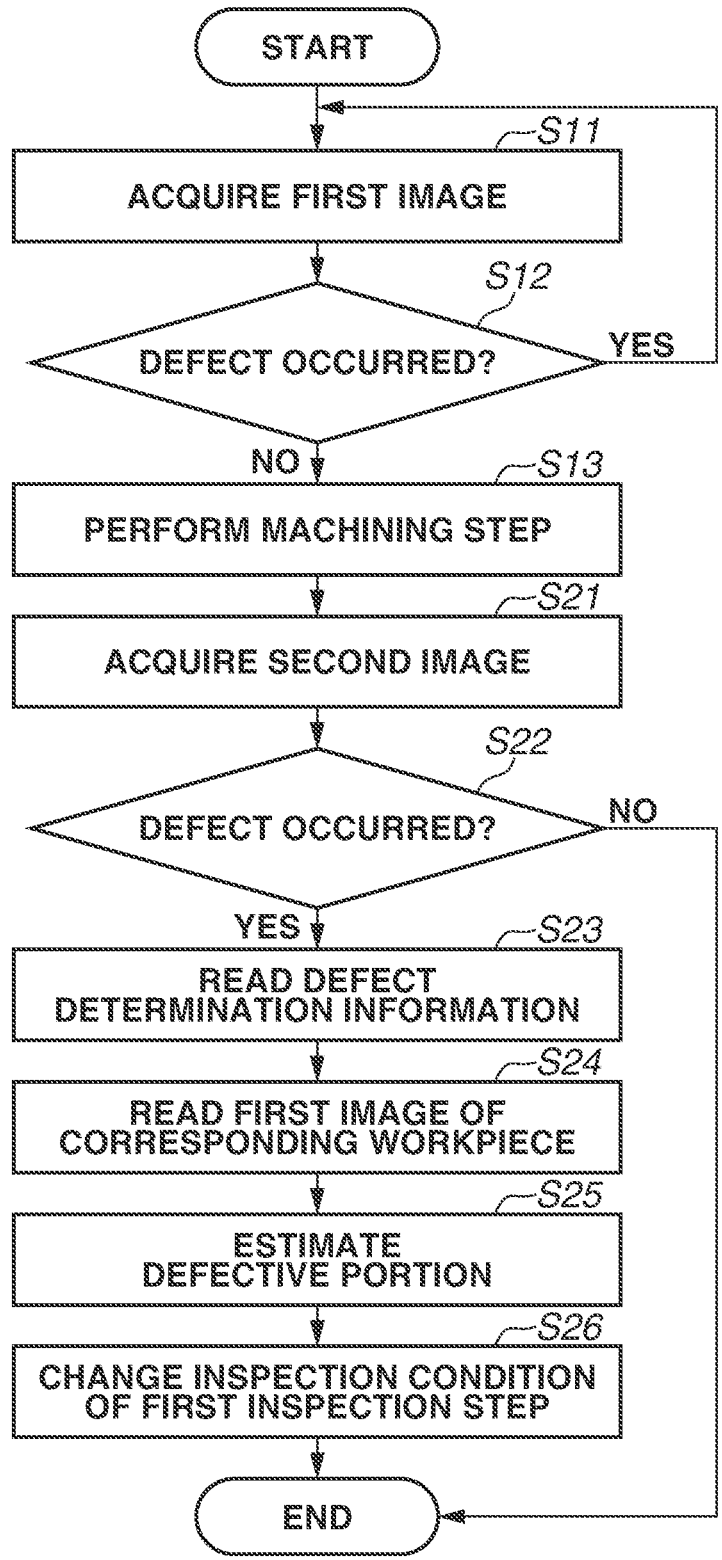

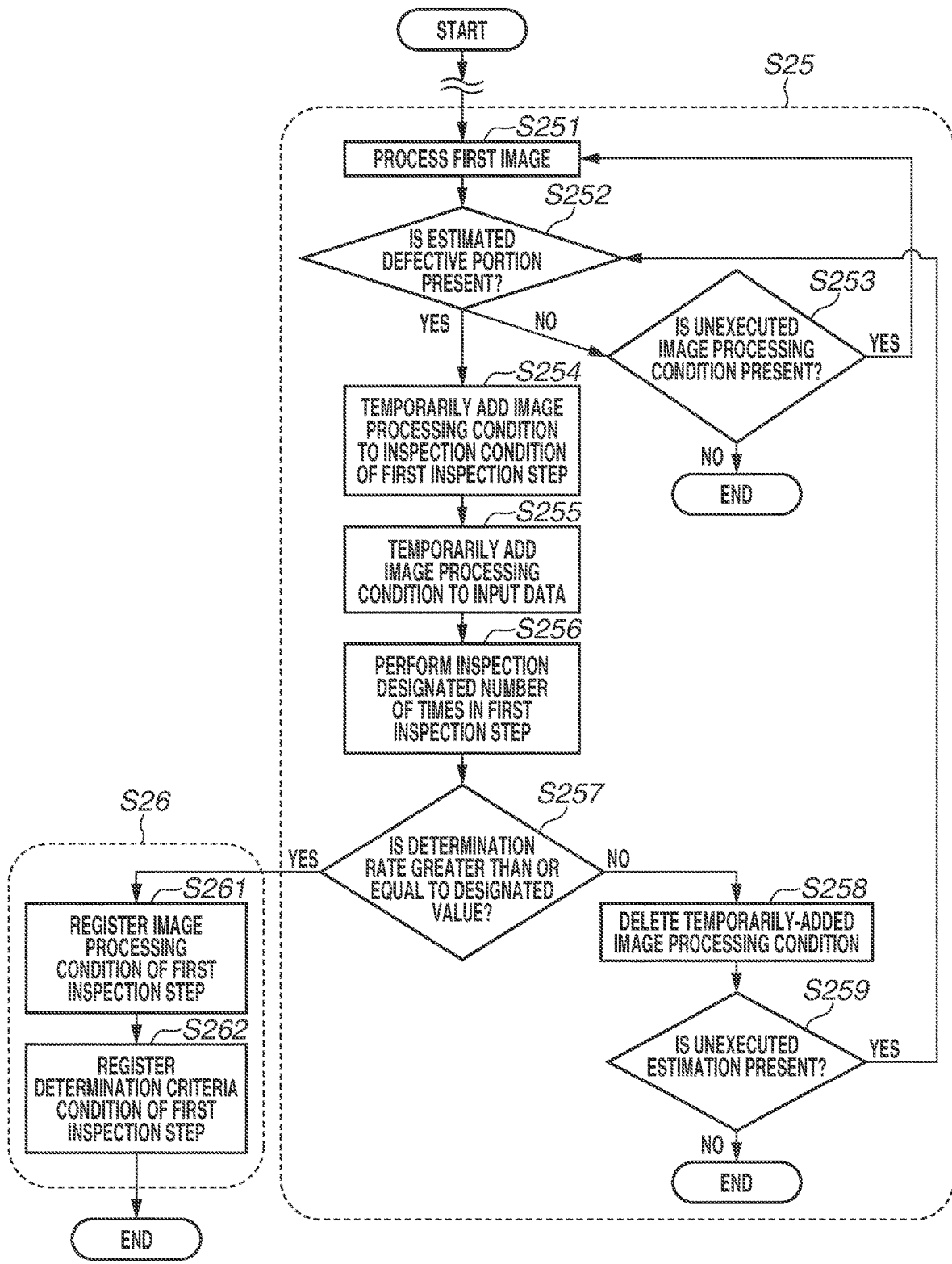

INSPECTION SYSTEM, MANAGEMENT APPARATUS, INSPECTION METHOD, RECORDING MEDIUM, AND MANUFACTURING METHOD OF ARTICLE

BACKGROUND

Field of the Disclosure

The present disclosure relates to an inspection system, a management apparatus, an inspection method, a recording medium, and a manufacturing method of an article.

Description of the Related Art

Quality of a product requested by a user is increasing year by year, and a request level of an appearance of the product is increasing year by year. Thus, a manufacturer is requested to visualize and evaluate fine appearance differences of the product, such as a flaw, a dust, a stain, a coating defect, and color unevenness of a film, in an appearance inspection before shipment of the product.

Japanese Patent Application Laid-Open No. 2014-66599 discusses an inspection method and an inspection apparatus that determine the presence/absence of a defect by performing image processing on an image including an object.

Before shipment of the product, a plurality of inspection steps is performed, and thus, there may be a case where an appearance defect not revealed in a preceding inspection step is found in a subsequent inspection step for the first time. In such a case, a machining cost up to the subsequent step is wasted, and an additional cost is generated for redoing works from the preceding step.

SUMMARY

According to an aspect of the present disclosure, an inspection system includes an image capturing unit configured to capture an image of a workpiece, and a processing unit configured to determine quality of the workpiece based on the image captured by the image capturing unit, wherein the processing unit determines whether the workpiece includes a defect based on a second image captured by the image capturing unit in a second inspection step, wherein the processing unit extracts a defective portion candidate of the workpiece based on the second image and a first image captured by the image capturing unit in a first inspection step performed before the second inspection step, and wherein the processing unit changes an inspection condition of the first inspection step based on the extracted defective portion candidate of the workpiece.

Further features of various embodiments will become apparent from the following description of exemplary embodiments with reference to the attached drawings.

BRIEF DESCRIPTION OF THE DRAWINGS

FIG. 3 is a flowchart illustrating an aspect of an inspection method according to a second exemplary embodiment.

FIG. 4 is a flowchart illustrating an aspect of an inspection method according to a third exemplary embodiment.

DESCRIPTION OF THE EMBODIMENTS (Inspection System)

Figure 1:
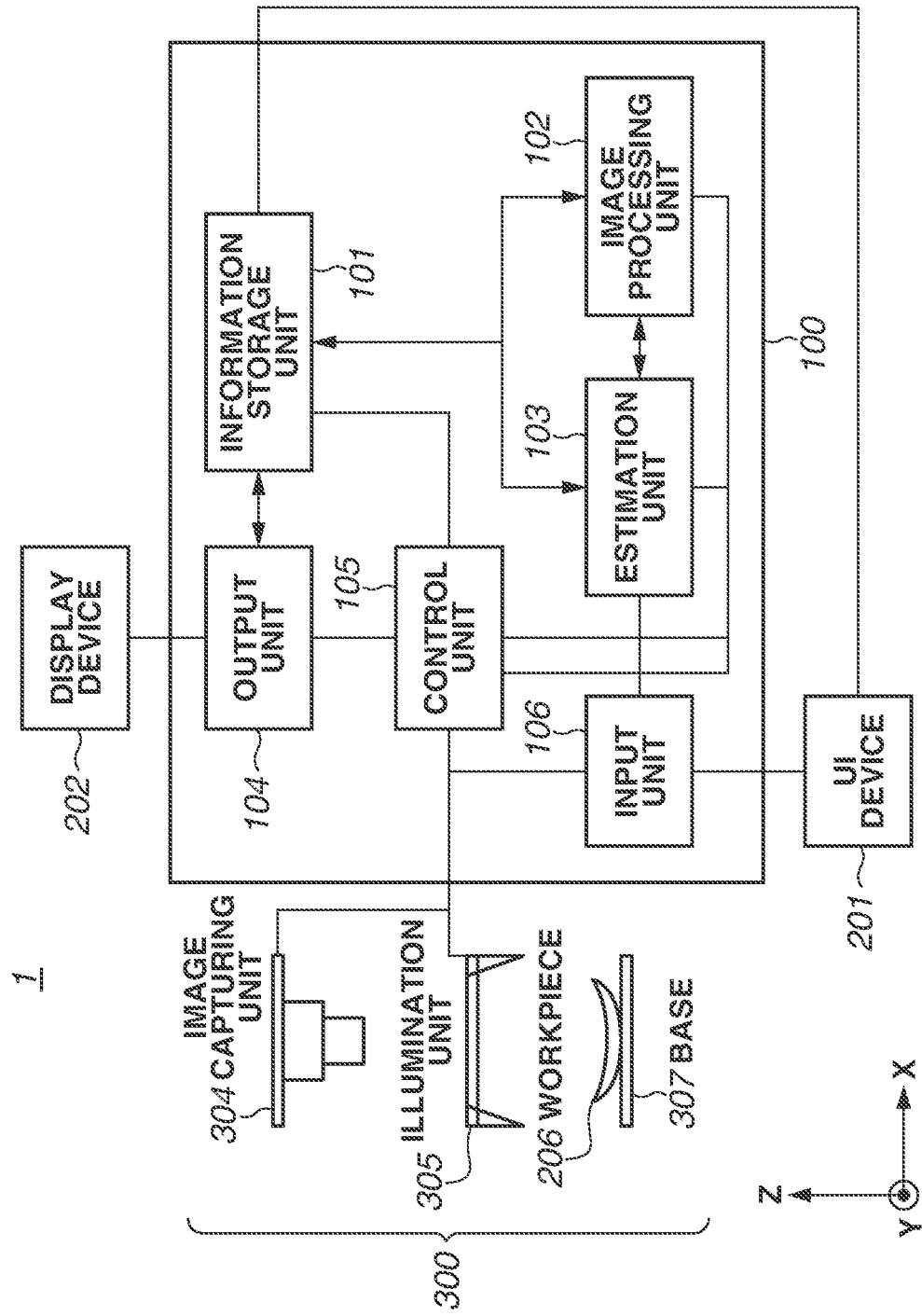
FIG. 1 is a schematic diagram illustrating an aspect of an inspection system according to a first exemplary embodiment.
Figure 2:
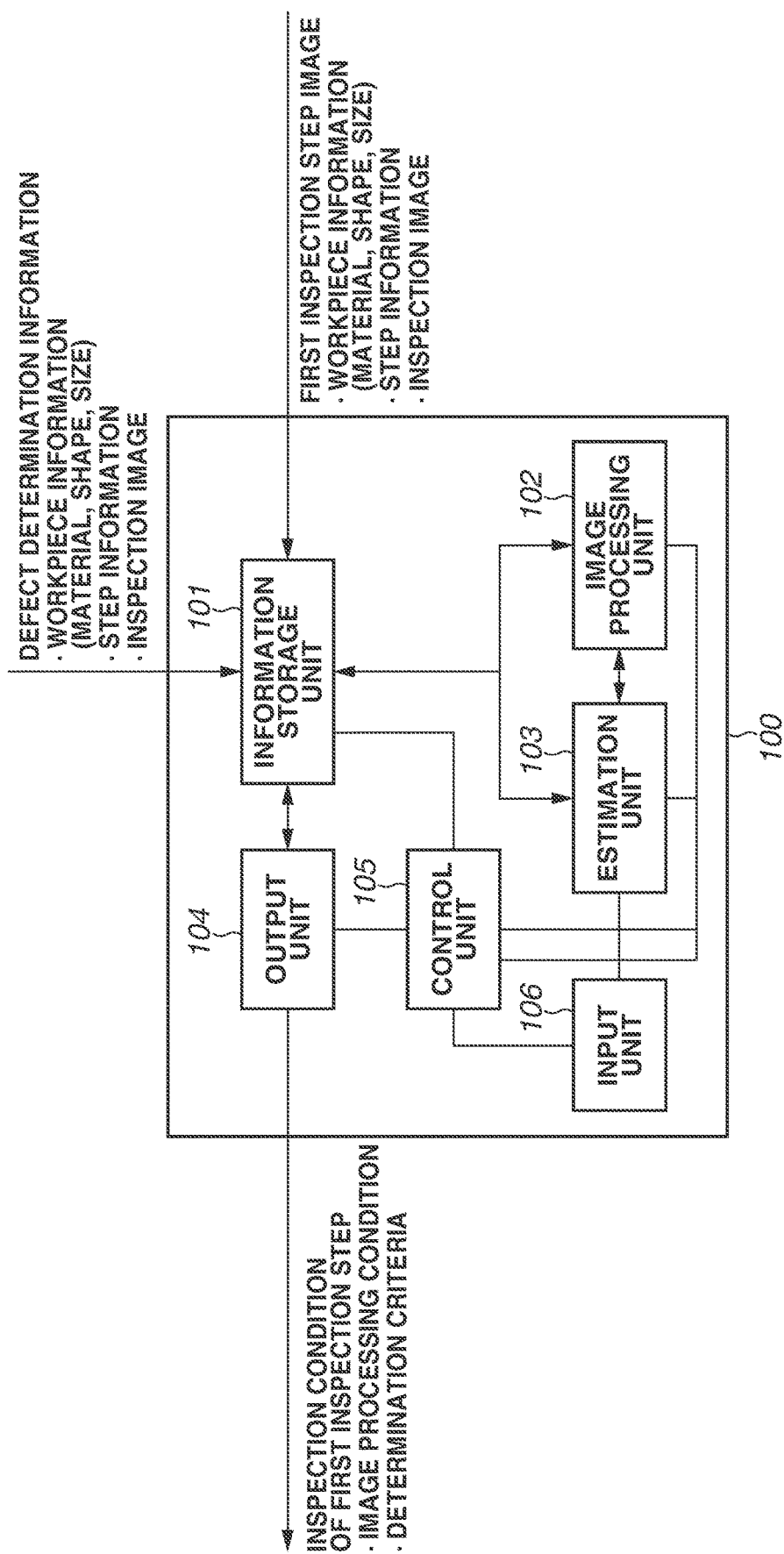
FIG. 2 is a schematic diagram illustrating an aspect of a processing unit according to the first exemplary embodiment.

FIG. 1 is a schematic diagram illustrating an inspection system 1 according to a first exemplary embodiment. The inspection system 1 includes an inspection apparatus 300 and a processing apparatus (processing unit) 100. FIG. 2 is a block diagram illustrating the processing apparatus 100.

The inspection apparatus 300 is an apparatus configured to inspect a workpiece 206. The inspection apparatus 300 includes an image capturing unit 304, an illumination unit 305, and a base 307.

The image capturing unit 304 includes an image capturing main unit (not illustrated) including an image capturing device in a housing, a lens unit (not illustrated) including an optical system, and an image capturing driving unit (not illustrated) configured to move positions of the image capturing main unit and the lens unit. A commercially-available digital camera can be used as the image capturing main unit and the lens unit. The image capturing unit 304 is movable in a Z direction and XY directions under control of a control unit 105 provided in the processing apparatus 100. Thus, a relative position between the image capturing unit 304 and the workpiece 206 is freely changeable. By changing the relative position therebetween, a user can change an image capturing area of the workpiece 206 and a focal position with respect to the workpiece 206.

The illumination unit 305 includes at least one light source and has a function to apply light to a surface of the workpiece 206 that is an inspection object of the inspection apparatus 300. The light source is, for example, a light-emitting diode (LED). The illumination unit 305 is attached to a pole (not illustrated) and is movable in the Z direction and the XY directions under the control of the control unit 105 provided in the processing apparatus 100. Thus, a relative position between the illumination unit 305 and the workpiece 206 is freely changeable. Further, the control unit 105 can turn on and off a power supply of the light source of the illumination unit 305. The number of light sources and shapes of the light sources of the illumination unit 305 are selected based on a type of the workpiece 206. For a workpiece having a circular shape in a planar view viewed from the Z direction, such as an optical lens, a light source having a ring shape is suitable. For a workpiece having a large shape, such as an exterior of a vehicle, a plurality of light sources is used, and the light sources are arranged so that light can be sequentially applied from a plurality of directions. A wavelength of the light source is selected based on the type of the workpiece 206 and a type of an appearance defect to be detected. For example, to detect a three-dimensional imperfection including minute irregularities, such as a flaw and peeling of a thin film, blue light having a wavelength in a range from 420 nm to 500 nm both inclusive is preferably used. Further, to determine the quality of the appearance, a high signal-to-noise (S/N) ratio is preferable. Further, LEDs are preferably arranged in high density, and LEDs each emitting linear light are preferably used.

The base 307 is a member on which the workpiece 206 that is the inspection object is placed. In the exemplary embodiment illustrated in FIG. 1, the base 307 does not include a drive mechanism to enable movement in the Z direction or the XY directions; however, the drive mechanism may be provided in the base 307, and the control unit 105 may control the relative position between the workpiece 206 and the illumination unit 305 or the relative position between the workpiece 206 and the image capturing unit 304. In FIG. 1, the workpiece 206 is an optical lens, namely a concave lens. However, the shape of the workpiece 206 is not limited thereto and may be a flat plate shape or a convex shape. In addition, the workpiece 206 may be a non-light transmitting workpiece or a light transmitting workpiece.

In FIG. 1, one inspection apparatus 300 is communicable with one processing apparatus 100; however, the number of inspection apparatuses 300 is not limited to one. One processing apparatus 100 may be communicable with a plurality of inspection apparatuses 300. Further, for a plurality of inspection systems 1, a general processing apparatus totally controlling processing apparatuses 100 of the respective inspection systems 1 may be used to control the inspection systems 1. Further, the general processing apparatus may control the processing apparatuses 100 via an external server and may be disposed at a remote place distant from places where the inspection apparatuses 300 are placed. Further, as the inspection apparatus 300, a commercially-available three-dimensional shape measuring apparatus may be used.

The processing apparatus 100 has a function to determine a quality of the workpiece 206 based on an image captured by the image capturing unit 304. Further, the processing apparatus 100 has a function to manage an inspection condition of the inspection apparatus 300. The processing apparatus 100 includes an information storage unit 101, an image processing unit 102, an estimation unit 103, an output unit 104, the control unit 105, and an input unit 106.

The information storage unit 101 has a function to store unique information on the workpiece 206 and an inspection condition of an inspection step. The unique information on the workpiece 206 includes, for example, a shape, a material, and a part number. Further, the information may be associated with a result of the quality determination, or machining data for the workpiece 206. The inspection condition includes a condition of image processing performed on the image by the image processing unit 102, and a condition (quality determination criteria) for determining quality of the workpiece 206 in the image. In addition to the above-described conditions, the inspection condition may include a position of the image capturing unit 304, an aperture and a focal length of the image capturing unit 304, an exposure condition of the image capturing unit 304, the relative position between the image capturing unit 304 and the workpiece 206, a position of the illumination unit 305, the wavelength of illumination light of the illumination unit 305, and the relative position between the illumination unit 305 and the workpiece 206. The information storage unit 101 stores data to be transmitted to the image processing unit 102 and the estimation unit 103, and outputs the data to the image processing unit 102 and the estimation unit 103. The information storage unit 101 may store not only the information in the inspection apparatus 300 but also information from a cloud or an external apparatus storing a database, via a network.

The image processing unit 102 has functions to read the condition of the image processing stored in the information storage unit 101, to perform processing on the image stored in the information storage unit 101, and to output a processed image or processed image information to the estimation unit 103. The image processing can be appropriately selected from known processing methods such as image conversion, deformation processing, and extraction of a feature amount. At this time, a machine learning function about an image processing method may be incorporated in the image processing unit 102, and only an image processing method suitable for estimation, determined by the machine learning function may be selectively output. The image captured by the image capturing unit 304 is not necessarily processed by the image processing unit 102, and an image not subjected to the processing may be output to the estimation unit 103.

The estimation unit 103 determines the quality of the workpiece 206 by using the image and the image information output from the image processing unit 102, and various kinds of information stored in the information storage unit 101. Conditions for determining the quality of the workpiece 206 in the image include, for example, a minimum size to handle a portion of, for example, a flaw, a dust, a stain, a coating defect, and color unevenness of a film as the imperfection, and a position where the imperfection occurs. The minimum size handled as the imperfection may be set based on a position of the workpiece 206 that is the inspection object. In a case where a machining step is present before an inspection step, the size and the position of the imperfection may be set based on the machining step. The estimation unit 103 determines quality of the workpiece 206 based on whether these conditions are satisfied.

The estimation unit 103 also has a function to estimate a defect occurrence portion of the workpiece 206 by using the image and the image information output from the image processing unit 102 and the various kinds of information stored in the information storage unit 101. A procedure for estimating the defect occurrence portion is described in a paragraph of the inspection method.

The estimation unit 103 may include a machine learning unit for machine learning, and a computer including a plurality of types of graphics processing unit (GPU) may be used for calculation of the machine learning. Known machine learning methods can be used. More specifically, the machine learning methods are largely classified into supervised learning, unsupervised learning, and reinforcement learning.

In a case where the supervised learning is used, examples of input data include an image of the workpiece in a preceding step (first inspection step described below), information about the workpiece, machining step information, and a condition of image processing performed on the image in the preceding step. Examples of training data include an image of the workpiece determined as including a defect in a subsequent step (second inspection step described below), the information about the workpiece, the machining step information, and a determination result. A defective portion of the workpiece and a similarity with an imperfection type of the workpiece estimated in the preceding step are estimated from the input data and the training data, and the defective portion of the workpiece and the similarity are output to construct a learning model. In the estimation of the similarity, a weighting operation of a parameter may be performed, and a weight thereof is changeable.

In a case where the unsupervised learning is used, examples of the input data include the image of the workpiece determined as including a defect in the subsequent step, the image of the workpiece in the preceding step, and the condition of the image processing performed on each of the images.

The output unit 104 has a function to output the image captured by the image capturing unit 304 and the image processed by the image processing unit 102 to a display device 202. Further, the output unit 104 can output the information stored in the information storage unit 101 to the display device 202.

The control unit 105 is connected to the information storage unit 101, the image processing unit 102, the estimation unit 103, and the output unit 104, and performs setting of various kinds of conditions and setting of the number of times estimation is to be performed. Further, the control unit 105 can control driving of the inspection apparatus 300, and control the inspection condition of the inspection apparatus 300. The control unit 105 further includes functions to change the inspection condition after the estimation unit 103 estimates the defective portion and to store the changed inspection condition in the information storage unit 101.

The input unit 106 has a function to temporarily store the information, such as the shape, the material, and the part number, on the workpiece 206 input by a user via a user interface device 201 (hereinafter, UI device 201) described below. The input unit 106 is, for example, a random access memory (RAM) or a hard disk drive (HDD). The input unit 106 is not necessarily connected to the UI device 201. Alternatively, an external device (not illustrated), such as a computer-aided device (CAD), may be connected, and the information on the workpiece 206 may be input to the input unit 106 from the external device. Further, the information on the workpiece 206 may be input to the input unit 106 from the database stored in the cloud via the network (not illustrated).

The processing apparatus 100 is connected to the UI device 201 and the display device 202.

The UI device 201 is connected to the input unit 106 in FIG. 1. The UI device 201 is an input device, such as a keyboard, a mouse, or a stylus pen.

The display device 202 is connected to the output unit 104 of the processing apparatus 100 in FIG. 1. The display device 202 is a display. In particular, the display device 202 is preferably a high dynamic range display that can display a high gradation image.

(Inspection Method)

Subsequently, a method of inspecting the workpiece 206 by using the inspection system 1 is described. FIG. 3 is a flowchart illustrating an aspect of an inspection method according to a second exemplary embodiment.

First, in S11, the workpiece 206 is placed on the base 307 of the inspection system 1, and a first image including a surface of the workpiece 206 opposite to a surface that is in contact with the base 307 is acquired (captured) by the image capturing unit 304. The acquired first image is stored in the information storage unit 101 in association with the inspection condition of the first image, the unique information on the workpiece 206, a history of processes performed so far, and the like. As the unique information on the workpiece 206, for example, the user can select information stored in the information storage unit 101 via the UI device 201. The inspection condition includes the condition of the image processing performed on the image by the image processing unit 102, and the condition for determining the quality of the workpiece 206 in the image. In addition to the above-described conditions, the inspection condition may include image capturing conditions, such as the position of the image capturing unit 304, the aperture and the focal length of the image capturing unit 304, the exposure condition of the image capturing unit 304, the relative position between the image capturing unit 304 and the workpiece 206, the position of the illumination unit 305, the wavelength of the illumination light of the illumination unit 305, and the relative position between the illumination unit 305 and the workpiece 206. The image processing may not necessarily be performed on the first image.

Next, in S12, the estimation unit 103 of the processing apparatus 100 determines, based on the acquired first image, whether a defect has occurred on surfaces of the workpiece 206. S11 and S12 are called the first inspection step. The first image and a result of the determination by the estimation unit 103 are displayed on the display device 202 via the output unit 104 and become viewable by the user. In a case where it is determined, from the first image acquired in the first inspection step, that the workpiece 206 includes a defect (YES in S12), the first inspection step is performed again, or the processing does not proceed to a step subsequent to the first inspection step.

Next, in S13, machining is performed on the workpiece 206 determined as not including a defect in the first inspection step. The type of machining performed on the workpiece 206 is not particularly limited. The machining is, for example, film formation such as vapor deposition, splay coating, spin coating, squeegee, and sputtering. Other than the film formation, for example, cutting, coating, application, molding, grinding, polishing, boring, and deformation may be performed. Performing such machining increases possibility that an appearance defect not revealed in the first inspection step is found for the first time in the subsequent second inspection step. However, the machining step may not necessarily be performed between the first inspection step and the second inspection step described below.

Subsequently, the second inspection step (S21 and S22) is performed on the machined workpiece 206. In the second inspection step, in S21, a second image of the workpiece 206 including the same surface as the surface acquired in the first image is first acquired (captured) by the image capturing unit 304. The acquired second image is stored in the information storage unit 101 in association with an inspection condition of the second image, the unique information on the workpiece 206, the history of processes performed so far, and the like. The types of information associated at this time may be the same as or different from the types of information associated with the first image. A plurality of image capturing units 304 may be provided, and a first image capturing unit performing the first inspection step may be different from a second image capturing unit performing the second inspection step. The second image is displayed on the display device 202 via the output unit 104, and becomes viewable by the user.

Next, in S22, the estimation unit 103 of the processing apparatus 100 determines based on the acquired second image whether a defect occurs on the surfaces of the workpiece 206. More specifically, the estimation unit 103 determines the quality of the workpiece 206 based on the quality determination criteria by the image and the image information output from the image processing unit 102 and the various kinds of information stored in the information storage unit 101. The quality determination criteria of the workpiece 206 in the image include, for example, the minimum size to handle a portion of, for example, a flaw, a dust, a stain, a coating defect, and color unevenness of a film as an imperfection, and a position where the imperfection occurs. The minimum size handled as the imperfection may be set based on a position of the workpiece 206 as the inspection object. Further, in a case where a machining step is present before the inspection step, the size and the position of the imperfection may be set based on the machining step. The estimation unit 103 determines the quality of the workpiece 206 based on whether these conditions are satisfied. A result of the quality determination is displayed on the display device 202 via the output unit 104 and becomes viewable by the user.

In a case where it is determined that the workpiece 206 does not include a defect (NO in S22), the inspection ends. On the other hand, in a case where it is determined that the workpiece 206 includes a defect (YES in S22), i.e., in a case where a defect of the workpiece 206 not found in the first inspection step is found in the second inspection step, the processing proceeds to next S23.

In the case where it is determined that the workpiece 206 includes a defect, the control unit 105 reads defect determination information in the second inspection step from the information storage unit 101 in S23. More specifically, in S23, the control unit 105 reads information on the workpiece 206 determined as including a defect, and provides the read information to the estimation unit 103 in association with the second image. Examples of the information associated with the second image include the material, the shape, and the size of the workpiece 206, a machining drawing used in the machining step, the machining step information, determination criteria for determining the workpiece 206 as including a defect, and a defect classification. Further, part number information, manufacturing information, and design data of the workpiece may also be associated with the second image.

Next, in S24, the control unit 105 reads the first image from the information storage unit 101 based on the read information, and provides the read first image to the estimation unit 103. In a case where a plurality of inspection steps is present before the second inspection step, the first image may be read in any of the plurality of inspection steps performed before the second inspection step; however, an image in the inspection step immediately before the second inspection step is preferably read. The estimation unit 103 may read the first image together with the information on the workpiece 206 and the inspection condition at the time when the first image is acquired.

Subsequently, in S25, the estimation unit 103 extracts information on a defective portion from the second image, and estimates a defective portion of the workpiece 206 based on the second image and the first image. More specifically, the estimation unit 103 extracts a defective portion candidate from the second image, and estimates a defective portion candidate area where the defective portion is present. The type and the position of the image processing performed on the first image are determined based on the estimated defective portion candidate area. Further, an imperfection, which is the defect occurrence portion, is extracted by the image processing, and the position of the imperfection is specified in the first image. One or a plurality of defective portion candidates may be extracted and one or a plurality of defective portion candidate areas may be estimated. In the image processing, a common image processing method for image data, such as image conversion, deformation, and information extraction of a feature amount, can be used. In particular, contrast adjustment, noise reduction, binarization processing, pattern recognition, and image expansion/contraction processing are suitable. A combination of such processing makes it possible to emphasize the imperfection that does not reach the defect determination criteria in the first inspection step, which enables recognition of the defective portion. The defective portion in the second image, the defective portion candidate area in the first image, and the processing result of the first image are compared in combination, which makes it possible to enhance the probability of the estimation of the defective portion in the first image. In addition, as a reason why the imperfection is revealed in the second step, there is displacement or rotation of the workpiece 206 in image capturing. Thus, the estimation unit 103 may estimate the defective portion after a positional relationship of the whole workpiece 206 is adjusted in the first image and the second image.

Further, to set the defective portion candidate area, the estimation unit 103 can use information on the machining step in S13. For example, in a case where the machining step is a film formation step and a film formation method is a method of forming a film from above the inspection surface, such as vapor deposition and spray coating, the defective portion candidate area of the first image is substantially the same as the defect occurrence portion of the second image. However, in a case where a film is formed by coating, such as spin coating and squeegee, the imperfection is often positioned on a coating starting point side of the defective portion candidate area. As described above, reflecting the type of machining step on the setting (condition) of the defective portion candidate area makes it possible to enhance the probability of the estimation of the defective portion in the first image.

Subsequently, the estimation unit 103 estimates the type of imperfection (defect classification) in the defective portion. Examples of the type of imperfection includes a flaw, a haze, coating defect, color unevenness of the film, a stain, and a dust. The user makes a list of the types of imperfection in advance and stores the list in the information storage unit 101 in association with the image including the workpiece 206. Based on the list, the estimation unit 103 estimates the type of imperfection. Further, the estimation unit 103 estimates a size of the imperfection in the defective portion. The estimation unit 103 can estimate the size of the imperfection based on information on the size of the imperfection extracted from the first image and information on the size of the imperfection extracted from the second image.

In S26, a new inspection condition of the first inspection step is created based on the image processing condition when the imperfection of the first image is estimated and information on the imperfection, and the inspection condition of the first inspection step stored in the information storage unit 101 is changed and registered. Items to be changed as the inspection condition include the image processing condition of the first image, and the quality determination condition to recognize an imperfection in the first image. In addition to the above-described conditions, the items to be changed as the inspection condition may include image capturing conditions, such as the position of the image capturing unit 304, the aperture and the focal length of the image capturing unit 304, the exposure condition of the image capturing unit 304, the relative position between the image capturing unit 304 and the workpiece 206, the position of the illumination unit 305, the wavelength of illumination light of the illumination unit 305, and the relative position between the illumination unit 305 and the workpiece 206.

The processing illustrated in FIG. 3 may be performed on every workpiece determined as including a defect as needed, may be performed only on a workpiece having a workpiece number designated by the user, or may be performed only on a workpiece having a part number for which an imperfection has been detected the specified number of times or more. The user may designate an execution frequency of the processing.

In the inspection method according to the second exemplary embodiment, the inspection condition of the first inspection step is changed based on the result of the defect determination in the second inspection step. Therefore, it is possible to improve inspection accuracy of the first inspection step. Further, a change in the inspection condition of the first inspection step makes it possible to estimate a result of the quality determination of the second inspection step after the machining step performed after the first inspection step, from the result of the first inspection step.

FIG. 4 is a flowchart illustrating an aspect of an inspection method according to a third exemplary embodiment. Processing of the inspection method according to the third exemplary embodiment is different in a method of estimating a defective portion (in S25) from the processing of the inspection method according to the second exemplary embodiment, and the third exemplary embodiment can enhance estimation accuracy as compared with the second exemplary embodiment. Processing in S11 to S24 are the same as the processing in corresponding steps of FIG. 3. Thus, the processing in S11, S12, S13, S21, S22, S23, and S24 are omitted in FIG. 4.

In S251, an image processing method is selected, and image processing is performed on the first image, which is captured in the first inspection step, read in S24. In S252, a resultant image and the defect determination information are compared, and estimation of a defect occurrence portion is performed on the first image. In a case where an imperfection candidate estimated as a defect occurrence cause is not present (NO in S252), it is determined in S253 whether an unexecuted image processing condition for the first image is present. In a case where an unexecuted image processing condition is present (YES in S253), the processing proceeds to S251. In a case where no unexecuted image processing condition is present (NO in S253), the processing ends.

In a case where an imperfection candidate that may be a defective portion is present in the estimation (YES in S252), the image processing condition and the determination condition selected in S251 are added as temporary inspection conditions of a first inspection step in S254 and S255. The order of the two operations may be reversed.

Next, in S256, inspection is performed the number of times designated by the apparatus or the user in the first inspection step. In S257, it is checked whether a determination rate designated by the apparatus or the user is obtained. At this time, the inspection object on which the inspection is performed the designated number of times may be a workpiece already inspected or a new workpiece. The determination rate is a proportion (rate) of the number of defects in the first inspection step to the number of defects in the second inspection step, determined under the temporary inspection conditions of the first inspection step. In a case where the determination rate is greater than or equal to the designated determination rate, it is determined that probability of the inspection condition of the first inspection step is high.

In S261, the image processing condition of the first inspection step determined by the above-described processing is registered. In S262, a determination criteria condition at the time is registered. Then, the processing ends. At this time, the order of S261 and S262 may be reversed. The processing illustrated in FIG. 4 is repeatedly performed on the defect of the same type, which improves accuracy of the determination criteria.

(Manufacturing Method of Article)

The inspection system according to any of the above-described exemplary embodiments is applicable to a manufacturing method of an article. A manufacturing method of an article according to a fourth exemplary embodiment includes inspecting surfaces of a workpiece by using the above-described inspection system, and performing predetermined processing on the inspected workpiece. The predetermined processing may be at least one selected from, for example, machining, conveyance, and assembly. The machining includes film formation, cutting, coating, application, molding, grinding, polishing, boring, and deformation. The manufacturing method of an article according to the present exemplary embodiment is advantageous in machining cost as compared with a conventional method.

In the above-described exemplary embodiments, the optical lens is used as an example of the workpiece; however, the exemplary embodiments are applicable to a workpiece other than a transparent workpiece such as the optical lens. The workpiece may be a transparent workpiece or a non-transparent workpiece, and the exemplary embodiments are applicable to inspection of a surface of a housing (body) of an automobile or a gemstone.

Further, some embodiments can be realized by supplying a program that implements one or more functions of the above-described exemplary embodiments to a system or an apparatus via a network or a recording medium, and causing one or more processors in a computer of the system or the apparatus to read and execute the program. Further, some embodiments can also be realized by a circuit (e.g., application specific integrated circuit (ASIC)) that implements one or more functions.

According to the exemplary embodiments, the inspection condition of the preceding inspection operation is changed based on the result of the defect determination in the subsequent inspection operation. This makes it possible to improve inspection accuracy of the preceding inspection operation. Further, it is possible to reduce the machining cost and a redoing cost generated before the subsequent inspection operation.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2020-194820, which was filed on Nov. 25, 2020 and which is hereby incorporated by reference herein in its entirety.

What is claimed is:

1. An inspection system, comprising:
an image capturing unit configured to capture images of one or more workpieces; and
a processing unit configured to:
perform a first inspection step on a first workpiece, wherein the first inspection step includes obtaining a first image of the first workpiece from the image capturing unit and determining, based on the first image, whether the first workpiece includes a defect,
perform a second inspection step on the first workpiece, wherein the second inspection step includes obtaining a second image of the first workpiece from the image capturing unit and determining, based on the second image, whether the first workpiece includes a defect, wherein the second inspection step is performed after the first inspection step,
extract a defective portion candidate of the first workpiece based on the first image and on the second image,
change an inspection condition of the image capturing unit or the processing unit in the first inspection step based on the extracted defective portion candidate of the first workpiece, and
perform the first inspection step on a second workpiece according to the changed inspection condition, wherein the first inspection step includes obtaining a third image of the second workpiece from the image capturing unit and determining, based on the third image, whether the second workpiece includes a defect.

2. The inspection system according to claim 1, wherein the first inspection step includes performing image processing on the first image, and
wherein determining, based on the first image, whether the first workpiece includes a defect is further based on a result of the image processing.

3. The inspection system according to claim 1, wherein the inspection condition of the first inspection step includes an image processing condition of inspected images.

4. The inspection system according to claim 1, wherein the inspection condition of the first inspection step includes an image capturing condition of the image capturing unit.

5. The inspection system according to claim 1, wherein the processing unit determines whether workpieces include defects based on a previously constructed learning model, and wherein the inspection condition is a parameter of the learning model.

6. The inspection system according to claim 1, wherein a machining step to machine the first workpiece is performed between the first inspection step and the second inspection step.

7. The inspection system according to claim 6, wherein the change in the inspection condition of the first inspection step improves the estimation, in the first inspection step, of a result of quality determination of the workpiece after the machining step.

8. The inspection system according to claim 1,
wherein the image capturing unit includes a first image capturing unit and a second image capturing unit,
wherein the first image capturing unit captures an image of the first workpiece in the first inspection step, and
wherein the second image capturing unit captures an image of the first workpiece in the second inspection step.

9. A management apparatus configured to manage an inspection condition of a first inspection step and an inspection condition of a second inspection step performed after the first inspection step, the management apparatus comprising:
one or more memories; and
one or more processors, wherein the one or more memories and the one or more processors are configured to:
perform a respective series of inspection steps on a respective workpiece in a plurality of workpieces, wherein each series of inspection steps includes a first inspection step and a second inspection step;
wherein the first inspection step includes obtaining a first image of the respective workpiece from an image capturing unit and determining, based on the first image, whether the respective workpiece includes a defect,
wherein the second inspection step includes obtaining a second image of the respective workpiece from the image capturing unit and determining, based on the second image, whether the respective workpiece includes a defect, wherein the second image was captured after the first image was captured, and wherein the second inspection step is performed after the first inspection step,
extract a defective portion candidate of the respective workpiece based on the first image and on the second image,
change an inspection condition of the image capturing apparatus or the image capturing unit in the first inspection step based on the extracted defective portion candidate of the workpiece, and
perform the first inspection step on another workpiece of the plurality of workpieces according to the changed inspection condition.

10. An inspection method comprising:
performing, by a processing unit, a first inspection step on a first workpiece, wherein the first inspection step includes obtaining a first image of the first workpiece from an image capturing unit and determining, based on the first image, whether the first workpiece includes a defect;
performing, by the processing unit, a second inspection step on the first workpiece, wherein the second inspection step includes obtaining a second image of the first workpiece from the image capturing unit and determining, based on the second image, whether the first workpiece includes a defect, wherein the second inspection step is performed after the first inspection step;
extracting, by the processing unit, a defective portion candidate of the first workpiece based on the second image and on the first image; and
changing, by the processing unit, an inspection condition of the image capturing unit or the processing unit in the first inspection step based on the extracted defective portion candidate of the first workpiece.

11. A non-transitory computer-readable recording medium that stores a program for causing a computer to execute the inspection method according to claim 10.

12. A manufacturing method of an article, the method comprising:

inspecting a workpiece by using the inspection system according to claim 1; and performing predetermined machining on the inspected workpiece.

13. The inspection method of claim 10, further comprising:

performing the first inspection step on a second workpiece according to the changed inspection condition, wherein the first inspection step includes obtaining a third image of the second workpiece from the image capturing unit and determining, based on the third image, whether the second workpiece includes a defect.

14. An inspection system, comprising:

an image capturing unit configured to capture an image of a workpiece; and a processing unit configured to determine quality of the workpiece based on the image captured by the image capturing unit, wherein the processing unit determines whether the workpiece includes a defect based on a second image captured by the image capturing unit in a second inspection step, wherein the processing unit extracts a defective portion candidate of the workpiece based on the second image and a first image captured by the image capturing unit in a first inspection step performed before the second inspection step, wherein a machining step to machine the workpiece is performed between the first inspection step and the second inspection step, and wherein the processing unit changes an inspection condition of the image capturing unit or the processing unit in the first inspection step based on the extracted defective portion candidate of the workpiece.

* * * * *